US008468288B2

(12) United States Patent
Corry et al.

(10) Patent No.: US 8,468,288 B2
(45) Date of Patent: Jun. 18, 2013

(54) METHOD FOR EFFICIENT GUEST OPERATING SYSTEM (OS) MIGRATION OVER A NETWORK

(75) Inventors: Kevin M. Corry, Austin, TX (US); Mark A. Peloquin, Austin, TX (US); Steven L. Pratt, Austin, TX (US); Karl M. Rister, Austin, TX (US); Andrew M. Theurer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 12/634,830

(22) Filed: Dec. 10, 2009

(65) Prior Publication Data

US 2011/0145471 A1    Jun. 16, 2011

(51) Int. Cl.
*G06F 12/00* (2006.01)
*G06F 12/10* (2006.01)
*G06F 13/00* (2006.01)

(52) U.S. Cl.
USPC ............ 711/6; 711/170; 711/E12.001; 718/1

(58) Field of Classification Search
None
See application file for complete search history.

(56) References Cited

U.S. PATENT DOCUMENTS

| 7,257,811 | B2 | 8/2007 | Hunt et al. |
| 2005/0002340 | A1* | 1/2005 | Onodera et al. ............... 370/253 |
| 2005/0262251 | A1* | 11/2005 | Klemets et al. ............... 709/230 |
| 2005/0268298 | A1* | 12/2005 | Hunt et al. ......................... 718/1 |
| 2006/0005189 | A1* | 1/2006 | Vega et al. ......................... 718/1 |
| 2007/0169121 | A1 | 7/2007 | Hunt et al. |
| 2007/0180436 | A1 | 8/2007 | Travostino et al. |
| 2007/0249345 | A1* | 10/2007 | Wada ......................... 455/435.1 |
| 2008/0127182 | A1* | 5/2008 | Newport et al. .................. 718/1 |
| 2009/0150529 | A1* | 6/2009 | Tripathi ....................... 709/222 |
| 2010/0306381 | A1* | 12/2010 | Lublin et al. .................. 709/226 |
| 2011/0107044 | A1* | 5/2011 | Young et al. .................. 711/162 |
| 2011/0131568 | A1* | 6/2011 | Heim ............................... 718/1 |

* cited by examiner

*Primary Examiner* — Michael Krofcheck
(74) *Attorney, Agent, or Firm* — Yudell Isidore Ng Russell PLLC

(57) ABSTRACT

A method, data processing system and computer program product enables efficient transfer of a virtual machine from a first data processing system (DPS) to a second DPS using a combination of Transmission Control Protocol (TCP) and Uniform Data Protocol (UDP). A virtual machine migration (VMM) utility identifies all memory pages of the first virtual machine. The VMM utility notifies the second DPS via TCP of the scheduled transfer of the virtual machine. The VMM utility copies and transfers the memory pages of the virtual machine to the second DPS via UDP. When all expected components of the virtual machine are not received by the second DPS and/or memory data is modified within the memory pages during the migration, the VMM utility combines the missing data and the modified data and transfers the final components of the virtual machine using TCP. Execution of the virtual machine resumes on the second DPS.

22 Claims, 5 Drawing Sheets

METHOD FOR EFFICIENT GUEST OPERATING SYSTEM (OS) MIGRATION OVER A NETWORK

BACKGROUND

1. Technical Field

The present invention generally relates to data processing systems and data networks and in particular virtual machine migration between data processing systems across data networks.

2. Description of the Related Art

Live virtual machine migration (also referred to as live guest migration) is a process by which operations executing within a server are transferred to another server. A virtual machine is a virtual sharing/partitioning of a computer's resources including processor(s), memory, storage and Input/Output (I/O) functionality. Copying memory of a guest/virtual machine (for live guest migration) from one server to another is typically slow and requires a large amount of overhead. Current methods for performing virtual machine migration employ Transmission Control Protocol/Internet Protocol (TCP/IP) to transfer data. Because of the complexity of the TCP/IP protocol, the transfer process generally places a significant load on the central processor unit (CPU). Since the server must dedicate CPU cycles to the transfer, the guest's performance may be adversely impacted.

BRIEF SUMMARY

Disclosed are a method, data processing system and computer program product enables efficient transfer of a virtual machine from a first data processing system (DPS) to a second DPS using a combination of Transmission Control Protocol (TCP) and Uniform Data Protocol (UDP). A virtual machine migration (VMM) utility identifies all memory pages of the first virtual machine. The VMM utility notifies the second DPS via TCP of the scheduled transfer of the virtual machine. The VMM utility copies and transfers the memory pages of the virtual machine to the second DPS via UDP. When all expected components of the virtual machine are not received by the second DPS and/or memory data is modified within the memory pages during the migration, the VMM utility combines the missing data and the modified data and transfers the final components of the virtual machine using TCP. Following the UDP phase of the transfer, execution of the virtual machine resumes on the second DPS.

The above as well as additional objectives, features, and advantages of the present invention will become apparent in the following detailed written description.

BRIEF DESCRIPTION OF THE SEVERAL VIEWS OF THE DRAWINGS

The invention itself, as well as advantages thereof, will best be understood by reference to the following detailed description of illustrative embodiments when read in conjunction with the accompanying drawings, wherein.

DETAILED DESCRIPTION

Figure 1:
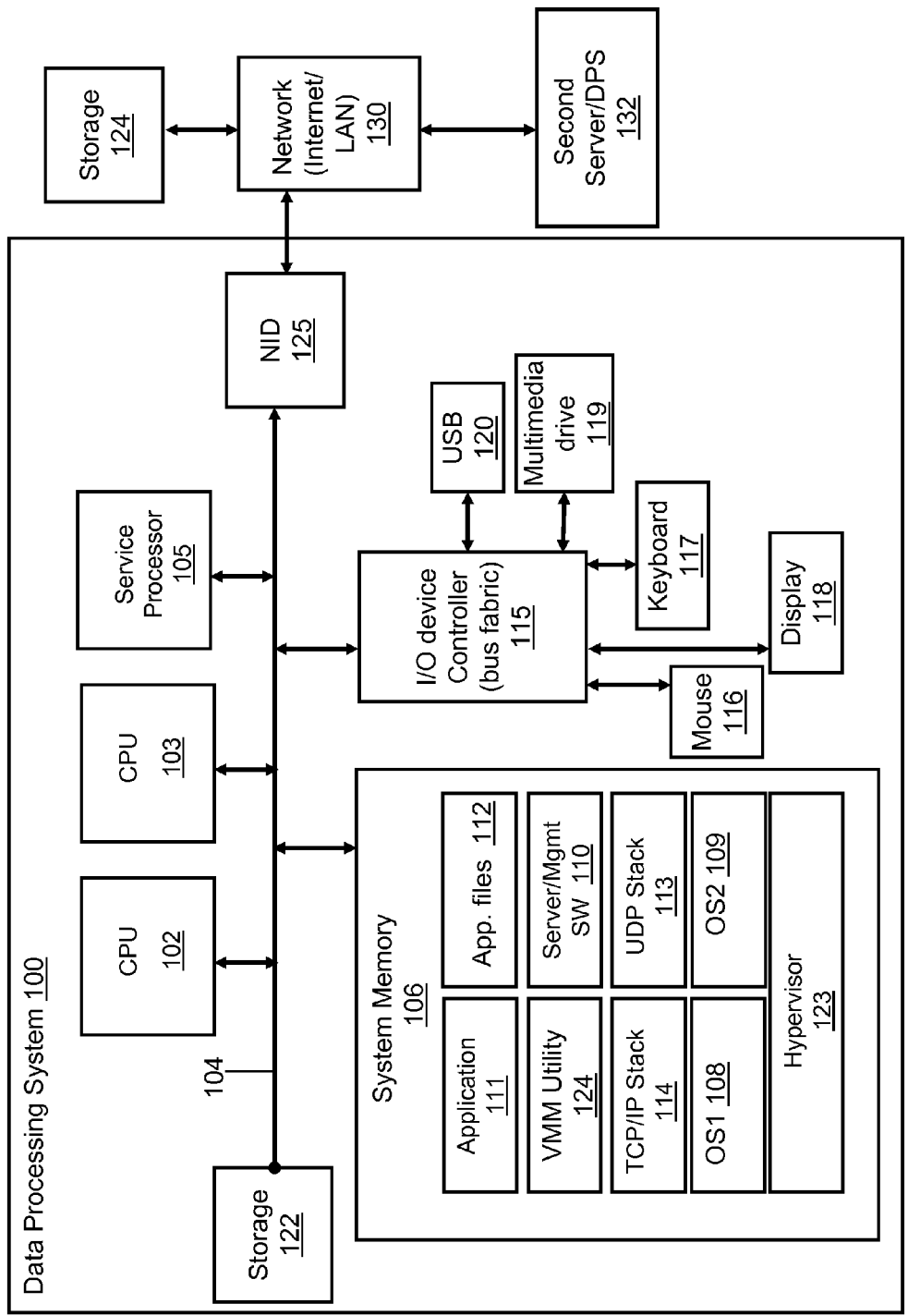
FIG. 1 provides a block diagram representation of an example data processing system within which features of one embodiment of the invention may be practiced.

Portions of the illustrative embodiments provide a method, a data processing system and a computer program product enables efficient transfer of a virtual machine from a first data processing system (DPS) to a second DPS using a combination of Transmission Control Protocol (TCP) and Uniform Data Protocol (UDP). A virtual machine migration (VMM) utility identifies all memory pages of the first virtual machine. The VMM utility notifies the second DPS via TCP of the scheduled transfer of the virtual machine. The VMM utility copies and transfers the memory pages of the virtual machine to the second DPS via UDP. When all expected components of the virtual machine are not received by the second DPS and/or memory data is modified within the memory pages during the migration, the VMM utility combines the missing data and the modified data and transfers the final components of the virtual machine using TCP. Following the UDP phase of the transfer, execution of the virtual machine resumes on the second DPS.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

With reference now to the figures, and beginning with FIG. 1, there is depicted a block diagram representation of an example data processing system (DPS), as utilized within one embodiment. DPS 100 may be a computer, a server, and/or other types of electronic devices that may generally be considered data processing devices. As illustrated, DPS 100 comprises two processors or central processing units (CPUs) respectively illustrate by CPU 102 and CPU 103. CPUs 102, 103 are connected via system fabric/interconnect/bus 104 to one or more system memories, of which memory 106 is illustrated. In the virtualization environment described herein, CPUs 102, 103 and memory 106 respectively provides processor resources and memory resources to one or more virtual machines executing within the virtualized environment. The virtualization environment may be supported via use of service processor 105, which is illustrated coupled to interconnect 104. Also connected to system bus 104 is input/output (I/O) device controller 115, which further provides fabric level or bus level connectivity and control for various input devices, of which pointing device (or mouse) 116 and keyboard 117 are illustrated. I/O device controller 115 also provides connectivity and control for output devices, of which display 118 is illustrated. Additionally, a multimedia drive 119 (e.g., compact disk read/write (CDRW) or digital video disk (DVD) drive) and USB (universal serial bus) port 120 are illustrated, coupled to I/O device controller 115. Multimedia drive 119 and USB port 120 enable insertion of a removable storage device (e.g., optical disk or "thumb" drive, respectively) on which data/instructions/code may be stored and/or from which data/instructions/code may be retrieved. DPS 100 also comprises storage 122, within/from which data/instructions/code may also be stored/retrieved. DPS 100 is also illustrated with a network interface device (NID) 125, by which DPS 100 may connect to one or more second server or DPS 132 via one or more access/external networks 130, of which the Internet or local access network (LAN) are provided as examples. External storage device 124 may also be accessible via network 130.

Those of ordinary skill in the art will appreciate that the hardware components and/or basic configuration depicted in FIG. 1 (and the configurations depicted within other figures presented herein) may vary. The illustrative components within these figures (e.g., DPS 100) are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

In addition to the above described hardware components of DPS 100, various features of the invention are completed/supported via software (or firmware) code or logic stored within memory 106 or other storage (e.g., storage 122) and executed by CPU 102. Thus, for example, illustrated within memory 106 are a number of software/firmware/logic components, including a first operating system (OS) illustrated as OS1 108 (e.g., Microsoft Windows®, a trademark of Microsoft Corp, or GNU®/Linux®, registered trademarks of the Free Software Foundation and The Linux Mark Institute), a second operating system (OS) illustrated as OS2 109, application 111, and application files 112. Also included in memory 106 (and associated with the operating systems) is Transmission Control Protocol/Internet Protocol (TCP/IP) 114, which is the suite of protocols that supports/enables cross network communication and transfer of messages and data from DPS 100 to other data processing systems connected via network 130. In addition, memory 106 further includes Uniform Data Protocol (UDP) 113, a second suite of protocols designed specifically for enabling cross network efficient data transmission between DPS 100 and other data processing systems or servers (e.g., second server/DPS 132) via network 130. Additionally, memory 106 comprises Hypervisor 123, server management software 110 and Virtual Machine Migration (VMM) utility 124. Hypervisor 123 locally divides the various resources of DPS 100 (including processor resources from CPU 102, 123 and memory resources from memory 106) of DPS 100 to provide resource platforms for executing one or more virtual machines. Hypervisor 123 in an alternate illustration may be provided within a separate memory component and executes on service processor 105 to generate/enable the virtualization of the various resources to individual virtual machines.

Processes associated with the described embodiments of the invention are implemented within a virtualization environment and are implemented with the execution of VMM utility 124 within DPS. In some implementations, a similar VMM utility also executes on second server/DPS 132 to enable the receiving side processes for migration of the virtual machine, as described herein. In implementation VMM utility 124 may be combined with/within one or more other software modules, including server management software 110, or hypervisor 123 to provide a single executable component, collectively providing the various functions of each individual software component when the corresponding combined code of the executable component is executed by the CPU 102/103 or service processor 105. For simplicity, VMM utility 124 is illustrated and described as a standalone or separate software/firmware component/module, which provides specific functions, as described below. As a standalone component/module, VMM utility 124 may be acquired as an off-the-shelf or after-market enhancement to existing program applications, such as server management software 107 or hypervisor code (123). In at least one implementation, VMM utility 124 may be downloaded from a server or website (e.g., second server 132), and installed on DPS 100 or executed from the second server (132).

CPU 101 executes VMM utility 124 as well as the operating system (OS1 108 and/or OS2 109) which supports the user interface features of VMM utility 124, such as generation of a graphical user interface (GUI), where supported/provided by VMM utility 124. In the described embodiment, VMM utility 124 generates/provides one or more GUIs to enable user interaction with, or manipulation of, functional features of VMM utility 124. TCP/IP 114 and/or UDP 113 are thus access by the operating system to enable VMM utility 124 to perform the migration processes/functions of the described embodiments.

Certain of the functions supported and/or provided by VMM utility/logic 124 are enabled as processing logic (or code) executing on DSP 100 (via CPUs 102/103 and/or other device hardware), which processing logic completes the implementation of those function(s). Among the software code/instructions/logic provided by VMM utility 124, and which are specific to the described embodiments of the invention, are code/logic that executes on the DPS 100 and completes a method, which comprises: identifying all memory pages of the virtual machine for a migration of the virtual machine to a second data processing system with a second memory, wherein the migration involves copying of the memory pages from the first memory resource to the second memory; the processor resources sending a virtual machine transfer notification, via transmission control protocol (TCP), to the second DPS alerting the second DPS of the migration of the virtual machine to the second DPS; receiving via TCP a first acknowledgement from the second DPS, which first acknowledgement includes a maximum allowed transfer rate for copying memory from the first DPS to the second DPS. The executable code/logic further completes the following functions as a part of the method: forwarding via User Datagram Protocol (UDP) a plurality of packets comprising the memory pages of the virtual machine identified for migration; when substantially all of the memory pages of the virtual machine have been forwarded via UDP, sending via TCP a completion message to the second DPS to indicate completion of the initial migration of the memory pages of the virtual machine; responsive to receiving from the second DPS a second notification via TCP indicating that one or more packets or memory pages was not successfully received during the forwarding of the plurality of packets, packaging and forwarding via TCP any missing portions of the memory pages not successfully received by the second DPS.

Embodiments of the method provided by the executable code/logic further comprises: setting all memory pages of the memory resources allocated to the virtual machine and which are to be migrated to a read only state prior to initiating the migration; detecting when a write operation targets the memory pages during the migration of the memory pages and any modifications to the memory resources of the virtual machine at the first DPS, which modifications occurred after initiation and before completion of the migration of the virtual machine; enabling a write update of the memory pages targeted by the write operation; tracking each memory page updated by one or more write operations occurring post initiation of the migration; and following receipt of the second notification from the second DPS via TCP, retransmitting, via TCP, a copy of each memory page which has been modified during the migration of the virtual machine, wherein the updated memory pages are the memory pages that are tracked via the tracking process.

In one embodiment, the retransferring via TCP of the copy of each memory page modified during the migration is performed concurrent with the packaging and forwarding via TCP of any missing portions of the memory pages not successfully received. Then, features of the method further include: coalescing as a combined remaining memory for migration the memory pages that were not successfully transmitted with the memory pages that were modified during the migration; evaluating a size of the combined remaining memory against a preset maximum size for performing virtual memory migration using TCP; when the size of the combined remaining memory is larger than the maximum size: automatically forwarding the combined remaining memory to the second DPS via UDP; and continue execution of the virtual machine on the first DPS during the migration until all memory pages have been transmitted to the second DPS. Also, when the size of the combined remaining memory is smaller than the maximum size: automatically forwarding the combined remaining memory to the second DPS via TCP; and pausing execution of the virtual machine of the first DPS to avoid further modification of the memory pages during final migration. Thus a re-transmission of memory pages not received by the second DPS is defaulted to a TCP transmission rather than a UDP transmission when a size of the combined remaining memory for migration falls below a preset threshold size.

Additional functionality of the method comprises: sending via TCP to the second DPS an identification of the specific memory portions/pages that will be migrated to second DPS; when the second notification or a subsequent notification from the second DPS indicates that all of the memory pages identified for migration have been successfully received at the second DPS: halting execution of the virtual machine on the first DPS when only a small portion of memory pages remain to be transmitted and can be efficiently transmitted by TCP; performing the transmission of the small portion of memory pages remaining via TCP; signaling for resumption of the execution of the virtual machine on the second DPS.

Other embodiments of the method further comprises: dynamically determining a threshold maximum value for a size of memory data to be migrated via TCP; when the size of memory data remaining to be migrated exceeds the threshold maximum, performing an initial transfer of memory pages of the virtual machine to the second DPS via UDP utilizing a rate of transfer substantially equal to or less than the maximum allowed transfer rate received from the second DPS in the first acknowledgment; and when the size of memory data remaining to be migrated does not exceed the threshold maximum, performing the transfer of memory pages of the virtual machine to the second DPS via TCP. Finally, in one embodiment, the method comprises: when the size of memory data remaining to be migrated is less than the threshold maximum: pausing an execution of the virtual machine on the first DPS; preventing further modification of the memory pages on the first DPS; and sending a notification to the second DPS to continue the execution of the virtual machine on the second DPS following receipt of final data via TCP.

According to the illustrative embodiments, when CPU 102 executes VMM utility 124, CPU 102/DPS 100 initiates a series of functional processes that enable the above functional features of the method as well as additional features/functionality. These features/functionality are described in greater detail below within the description of FIGS. 2-4.

Figure 2:
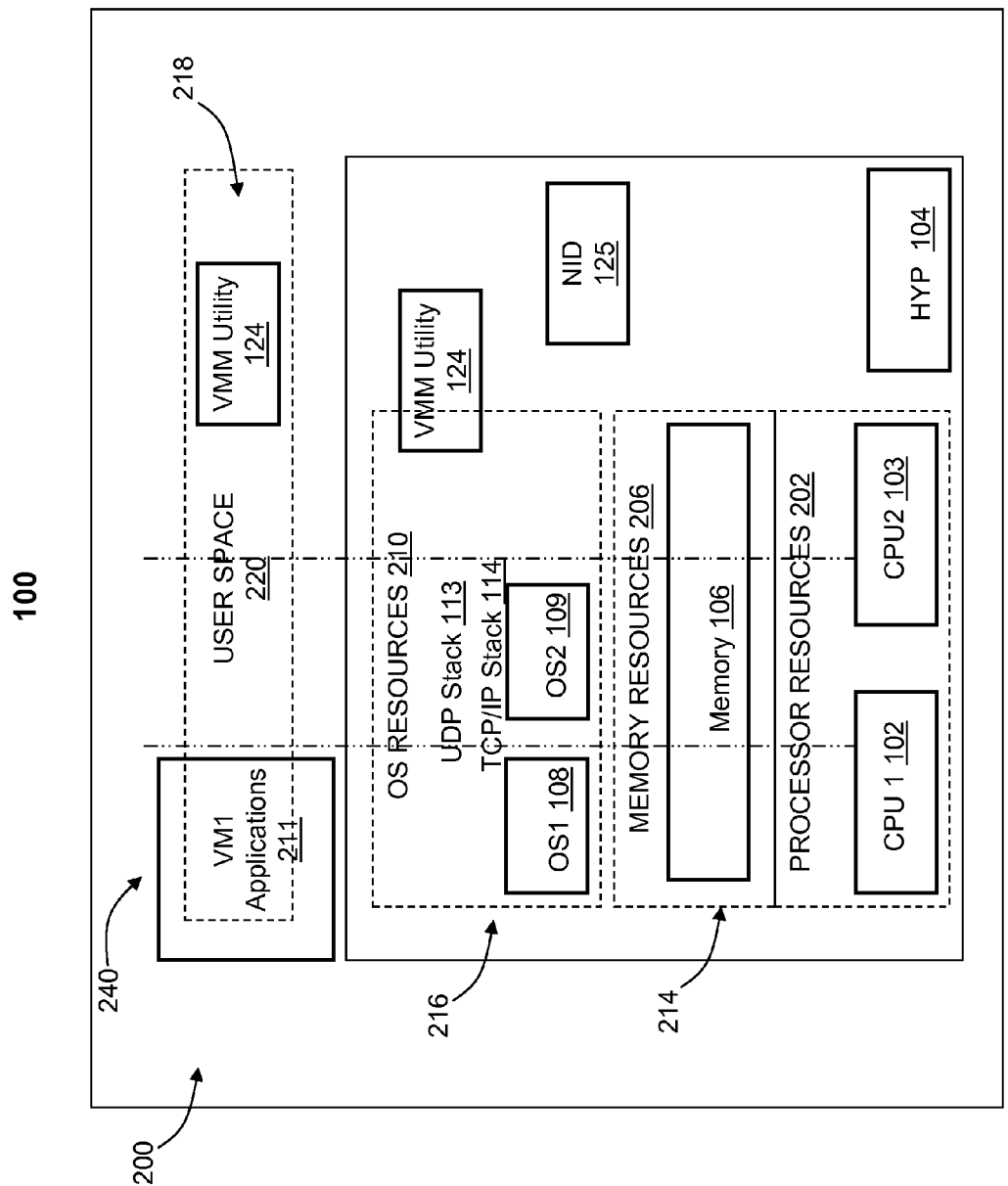
FIG. 2 provides a block diagram representation of an example virtualization environment with a virtual machine and allocated hardware ad software resources within an example data processing system, according to one embodiment.

With reference now to FIG. 2, there is depicted a block diagram representation of an example virtualization environment 200 on example DPS 100 (FIG. 1). As shown, virtualization environment 200 comprises processor resources 202 made up of a plurality of processors, CPU 102, 103, memory resources 206 made up of one or more memory or which memory 106 is provided as an example, and operating system resources 210 having two example OSes, OS1 108 and OS2 109. Included within OS resources 210 are UDP stack 113 and TCP/IP stack 114, both utilized during virtual migration as described herein. As provided, virtualization environment 200 comprises hardware space 214, OS space 216, and application/user space 218. In addition to these components, virtualization environment further comprises service processor 104, hypervisor 124 (which may execute on service processor 104 in one embodiment), and NID 125. NID 125 provides both hardware and software logic/firmware that enables data transmission and messaging functions of the DPS 100. NID 125 communicates locally with the OS (108/109) and functionality provided by UDP stack 113 and/or TCP/IP stack 114 to complete the virtual machine migration functions (particularly the data transfer and message exchange functions) described herein. The code/logic/firmware supporting the VMM functions are provide by VMM utility 124, which may be software utility/components that are part of and executed within the OS space 216 or an application which runs in user space 218.

Figure 3:
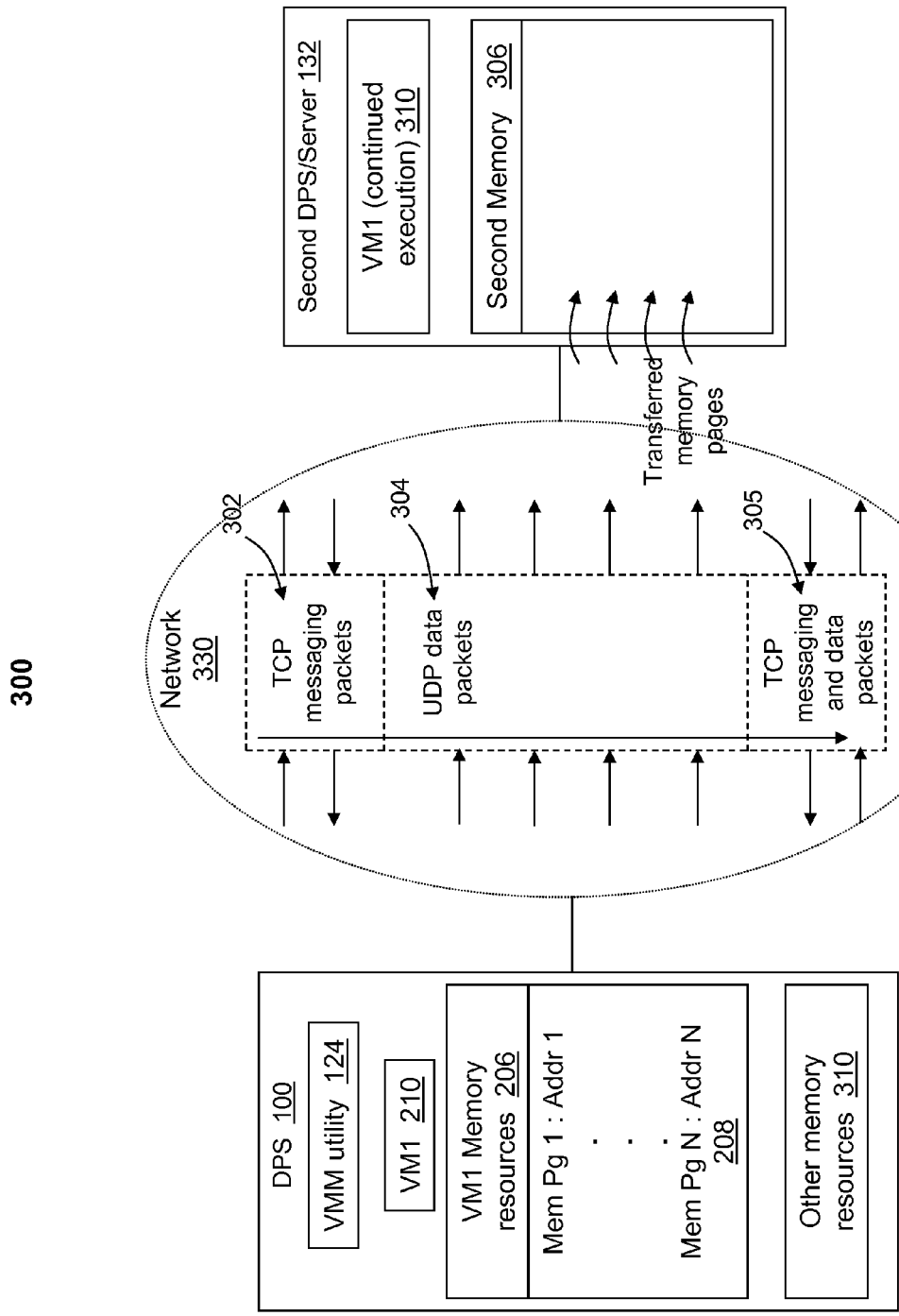
FIG. 3 illustrates an information/data exchange between a first and a second data processing system of memory pages and other information of a virtual machine during an example migration of the virtual machine across a computer network, according to one embodiment.

A first virtual machine 250 is indicated via dashed lines separating/segregating our portions of shared processor resources 202, shared memory resources 206, and shared OS resources 210. Virtual machine1 250 executes its own guest OS, 051 108, and provides the environment for execution of one or more VM1 applications 211. VM1 applications 211 execute within the user space 220 of the virtualization environment and enable reads and writes to the memory resources allocated to the particular virtual machine. While not explicitly illustrated, virtualization environment may further provide additional virtual machines, such as a second virtual machine (VM2), which would then be allocated its own share of processor resources 202, memory resources 206, and operating system resources 210 (e.g., OS2 109). Thus, as illustrated by FIG. 3, which is now described, virtual machine 250 is allocated specific memory pages 1 through N, with corresponding memory address 1 through N. In one embodiment, each virtual machine operates within a logical partition (LPAR) of the DPS 100. The vertical dashed lines of FIG. 2 may be utilized to exemplify such a logical partition; However, it is understood that the actual partitioning of resources is a more complex process than is illustrated herein, and the illustrations are not intended to provide any limitations as to the method or manner in which the virtualization environment is created or implemented.

FIG. 3 illustrates an overview of one embodiment of the information/data exchange between a first and a second data processing system of memory pages and other information of a virtual machine during an example migration of the virtual machine across a computer network. Computer network 300 generally comprises DPS 100, which is coupled to second DPS/Server 132 via a network fabric 330, such as the Internet. DPS 100 comprises VM1 210 (i.e., a first virtual machine), which has assigned thereto a specific VM1 memory resources 206. Within VM1 memory resources 206 are a plurality of memory pages 208, which have associated memory addresses (Addr1 . . . N). DPS 100 also comprises other memory resources 310 and VMM utility 124. Second DPS/server 132 comprises second memory 306. Following migration of VM1 210 from DPS 100, DPS2 132 then also comprises migrated VM1 310, which then continues execution on second DPS 132.

Network 330 generally illustrates the different phases of data/information transfer during the migration of VM1 from first DPS 100 to second DPS 132. Within the illustration, horizontal directional arrows indicate the transfer of data and/or exchange of messages and the direction of the message/data transfer between the two data processing systems. Also, a single vertical arrow indicates the time sequence of the transfer process. As delineated within network 330, three different phases of message/data transfer are supported/provided during migration of VM1 210 to second DPS 132. In migration phase one 302, messaging packets are exchanged between the two data processing systems via TCP. Following, in migration phase two 304, memory pages 208 (as data packets) of VM1 210 are transferred from first DPS 100 to second DPS 132 via UDP. Finally, in migration phase three 305, messages are exchanged between the two data processor systems. More importantly, a combination of messages and data packets is transferred to second DPS 132 during the final migration phase to complete the migration. As shown, the transferred memory pages are placed/stored within second memory 306 of second DPS 132. If second DPS operates a virtual environment, then specific memory resources are pre-allocated to the migrated VM1 310 and those memory resources then store the migrated memory pages of VM1 210.

Figure 4:
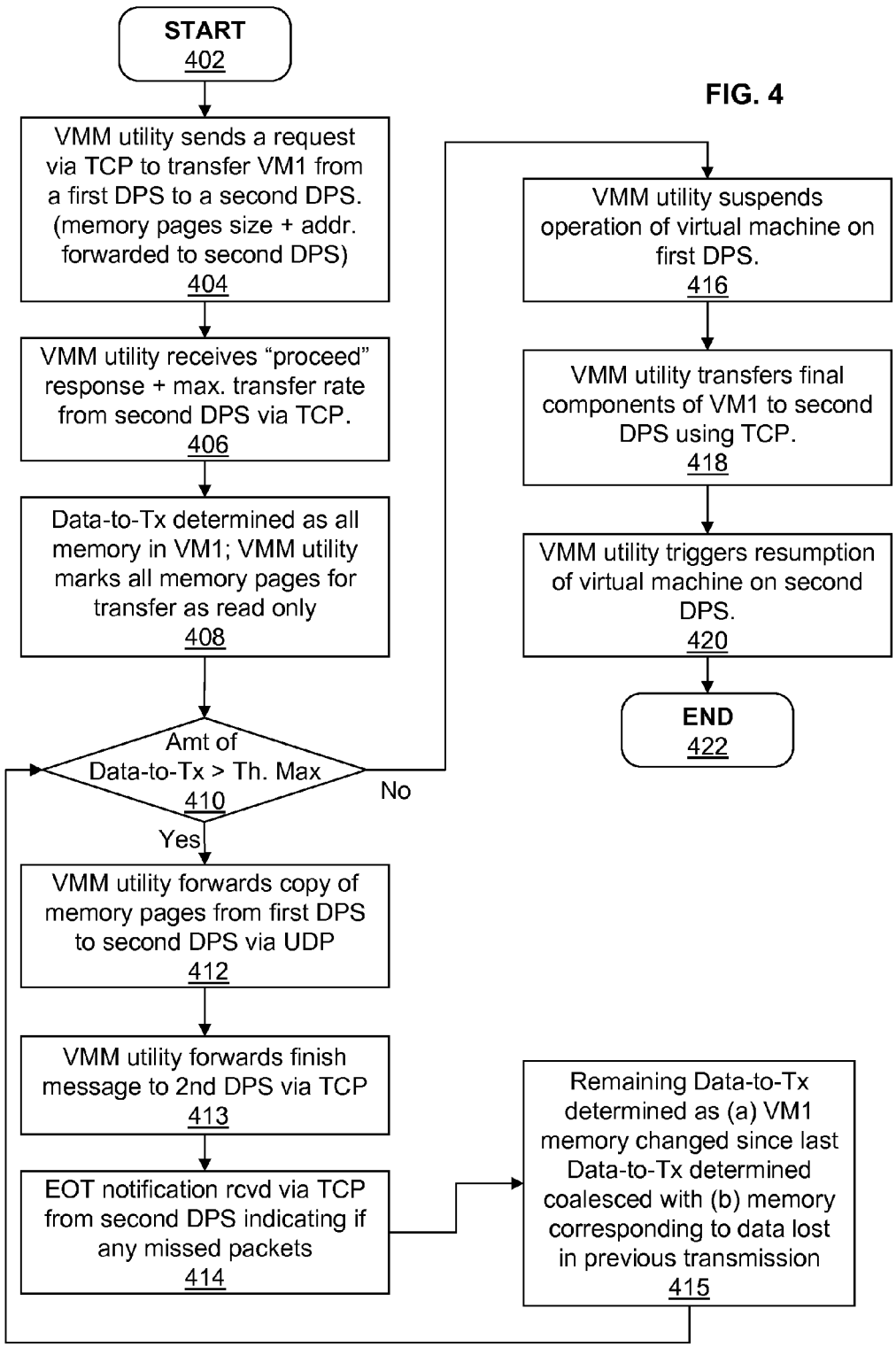
FIG. 4 is a flow chart illustrating the process of performing virtual machine migration utilizing a combination of transmission control protocol (TCP) and user datagram protocol (UDP) for data and message transfer, according to one embodiment.
Figure 5:
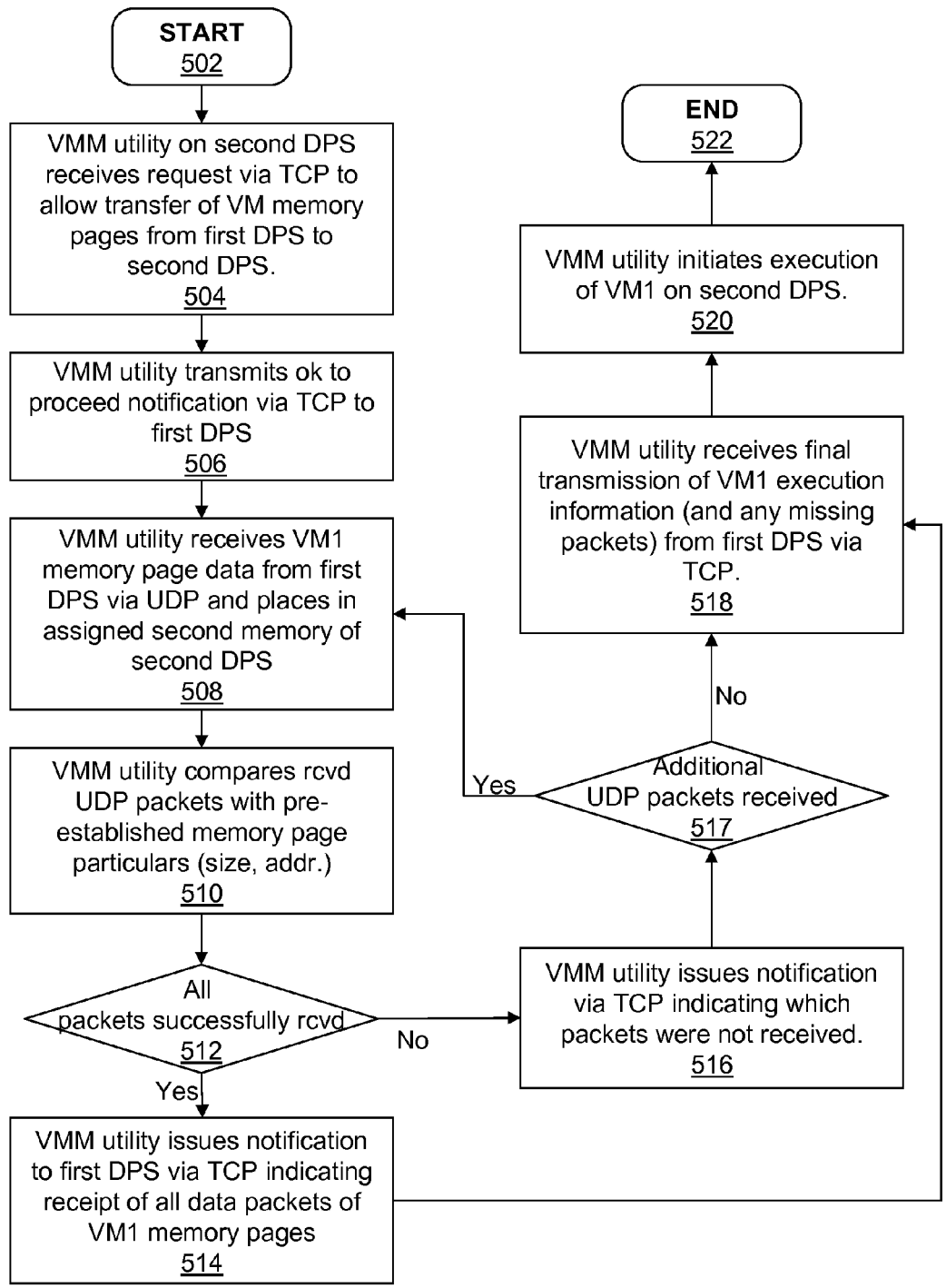
FIG. 5 is a flow chart illustrating the process of supporting the virtual machine migration via a combination of TCP/IP and UDP on the receiving data processing system, according to one embodiment.

FIGS. 4 and 5 are flow charts illustrating the methods by which the above processes of the illustrative embodiments are completed on the first (or sending) DPS and second (or receiving) DPS, respectively. In particular, FIG. 4 illustrates the process of performing virtual machine migration utilizing a combination of TCP and UDP. FIG. 5 then illustrates the process from the perspective of the receiving second DPS. Although the methods illustrated in FIGS. 4 and 5 may be described with reference to components shown in FIGS. 1-3, it should be understood that this is merely for convenience and alternative components and/or configurations thereof can be employed when implementing the method. Key portions of the methods may be completed by VMM utility 124 executing on a processor (e.g., Processor 102 within DPS 100 (FIG. 1) and controlling specific operations of/on DPS 100/132. The method is thus described from the perspective of either/both VMM utility 124 and DPS 100/132.

Referring again to virtual machine migration process described above and with reference to FIGS. 3 and 4, the process begins at block 402 following which VMM utility 124 sends a transfer request to DPS 132 informing DPS 132 of the pending transfer of VM1 210 (block 404). In response, VMM utility 124 receives a TCP notification from DPS 132 of a maximum allowed transfer rate to be utilized to transfer the virtual first machine or components of VM1 210 to DPS 132 (block 406). VMM utility 124 identifies memory pages 208 of VM1 210 for migration from DPS 100 to DPS 132. In on embodiment, these identified memory pages 208 may comprise one or more of OS1 108 and APP1 111 and application files 112 (FIG. 1). VMM utility 124 creates a first list of "memory-to-copy" (i.e., the memory pages that are selected for migration) as all memory pages of VM1 210. VMM utility 124 determines/calculates the data to transfer/transmit/migrate ("Data-to-Tx") as all the memory in VM1 210, and VMM utility 124 sets the memory pages to be migrated to a read only status (block 408).

With the above steps, VMM utility 124 initiates a notification procedure to inform DPS 132 via TCP (e.g., using one or more TCP messaging packets 302) of one or more of: (a) confirmation that VM1 210 is scheduled for transfer/migration; and (b) confirmation that components of the first virtual machine are scheduled for transfer/migration. VMM utility 124 receives an acknowledgement/notification from DPS 132 via TCP of confirmation of and readiness for the pending migration (step 406). With this notification received, VMM utility 124 initiates a virtual machine transfer procedure by which VMM utility 124 first determines whether the amount of data to be transferred is greater than a threshold maximum for utilizing UDP ((block 410). Assuming the amount of memory is at or greater than the maximum threshold, VMM utility 124 forwards/sends via UDP (e.g., using one or more of UDP data packets 304) a copy of the memory pages of VMM1 210 from DPS 100 to DPS 132 (block 412). In one embodiment, VMM utility 124 transfers the UDP packets at a transfer rate that is less than (or no greater than) the maximum transfer rate indicated by DPS 132 during initial TCP messaging (migration phase one 302). VMM utility 124 transmits a "finish" message via TCP to inform DPS 132 that all UDP packets for the current transmission session/"pass" have been sent (block 413). VMM utility 124 receives a (end of transmission) response from DPS 132, via TCP, indicating whether all of the transmitted UDP packets corresponding to the memory pages being migrated have been successfully received at DPS 132 (block 414). VMM utility 124 also determines/tracks whether changes have occurred in the memory pages following the initial marking of the memory pages as read only and associated migration of the memory pages for transfer via UDP. Specifically, VMM utility 124 tracks memory changes of VM1 memory pages resulting from write operations targeting specific memory pages of the memory pages indentified for migration. If changes have occurred to one or more of the memory pages following initiation of the migration of the "read only" copy/version of the memory pages, VMM utility 124 identifies the pages and/or corresponding areas of memory that were changed for future transmission to second DPS 132.

The EOT notification received from DPS 132 may indicate whether there are areas of the expected virtual machine's memory missing (i.e., one or more of the transmitted memory pages were not successfully received by DPS 132). Also, the VMM utility tacks whether changes have occurred in the VM1 memory pages at the first DPS 100 following initiation of the migration. VMM utility 124 determines the remaining data to transmit/migrate as (1) any missing areas of virtual machine memory that were not successfully received by DPS 132; and (2) any portions of VM1 memory that was changed/modified following VMM utility's initiation of the migration (i.e., marking pages as read only) (block 415). In actual implementation, VMM utility coalesces these memory components/sections such that overlaps are accounted for and only transmitted once.

VMM utility 124 next determines whether the size of the "memory-to-copy" is greater than a preset memory size limit (i.e., a maximum size threshold for utilizing TCP as the data transfer protocol, rather than UDP) (block 410). When the size of "memory-to-copy" is greater than the preset memory size limit, VMM utility 124 (a) initiates another notification procedure (described above) to inform DPS 132, via TCP, of components of the first virtual machine that are to be transmitted to DPS 132 via UDP; and (b) subsequently executes the transfer of the combined data via UDP to second DPS 132 (block 412). VMM utility 124 provides this second pass/transfer of memory pages via UDP without halting the operations of VM1 210 on first DPS 100. However, if the size of combined data (VM1 memory pages or memory components remaining to transfer to DPS 132") is less than or equal to the preset memory size limit, VMM utility 124 provides the following functions: (a) pausing operations of VM1 210 during transfer of the remaining components of the VM1 124 to second DPS 132 (block 416); and (b) transmitting via TCP (e.g., using one or more TCP data packets 305) the remaining data to transmit/migrate (i.e., previously dropped memory sections and VM1 memory components modified during the migration) of the first virtual machine to second DPS 132 (block 418). Thus, VMM utility 124 prevents further memory changes by halting the operations of the first virtual machine on first DPS 100.

VMM utility 124 coalesces the re-transmission of the dropped packet data (from previous the copy of components of the first virtual machine) with the transmission of the changed memory data (i.e., the data from the first virtual machine that changed following the previous copy), so that no extra transmission steps are needed to account for dropped packets. The last memory transfer uses TCP packets, so that no re-transmission attempts are needed to be implemented by the application for that last copy. The very last memory transfer in a live migration is typically a very small amount of data. As a result, the overhead impact of using TCP for this memory transfer is very small.

VMM utility 124 uses TCP's greater reliability (i.e., relative to UDP's reliability) for the final and small data transfer pass. In one embodiment, VMM utility 124 triggers a resumption of execution of the first virtual machine on DPS 132 upon receipt of all VM1 memory components of the first virtual machine (block 420). Then the migration process ends at termination block 422. In another embodiment, which is described below with reference to FIG. 5, a second VMM utility or some other process executing on second DPS 132 triggers the re-start/resumption of execution of migrated VM1 310 on second DPS 132.

Referring now to FIG. 5, the migration process begins at initiator block 502 and proceeds to block 504, at which second VMM utility 324 receives the request to transfer a virtual machine from a first DPS 100 to the second DPS 132. At block 506, VMM utility 324 transmits a message via TCP indicating acknowledgement of the request for migration and providing the maximum transfer rate for data transfer during the migration. VMM utility also triggers a memory allocation for the incoming memory pages of the VM being migrated. At block 508, VMM utility 324 receives the packets of the memory pages from first DPS 100 and places the packages in an assigned memory location. VMM monitors the received packets and compares the received memory pages/packets to the ones expected to be received at block 510. VMM utility 324 determines at block 512 whether all the expected packages were received. When all the packets were successfully received, VMM utility 324 issues a first notification to the first DPS 100 via TCP indicating that all packets were received (block 514). Otherwise, VMM utility 324 indicates in the notification that all expected packets were not received (block 516). As provided by decision block 517, the process of receiving VM1 memory packets via UDP may be repeated at second DPS 132 based one or more factors, including, for example, the size of VM1 memory being migrated, the number of dropped packets determined by second DPS 132 and notified to first DPS 100 during UDP transfer, and the rate of transmission provided by second DPS 132, and other factors. In one embodiment, the type and number of transmissions are controlled by the first DPS 100, while the second DPS 132 merely prepares for the receipt of UDP packets based on messages received from the first DPS 100.

At block 518, VMM utility 324 receives a final transmission of VM1 execution information/data including any missing packet and any data that has been modified on the first DPS since the transfer of the original data via UDP. VMM utility 324 then initiates execution of migrated VM1 on the second DPS 132 (block 520). The migration and restart of VM1 then ends at block 522.

In the flow charts above, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or logic. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as memory 106 of DPS 100 (FIG. 1) or a hard disk, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

From the above descriptions, embodiments of the invention provides a method performed in a first data processing system (DPS) having one or more processors coupled to at least a first memory and providing processor resources and memory resources for a virtual machine. The method comprises a plurality of processes for implementing efficient migration of the virtual machine using a multiple stage transfer that involves: (a) UDP transfer of the majority of memory pages of the virtual machine; and (b) TCP exchange of control messages between transferring devices and UDP transfer of a small portion of final remaining memory pages (dropped during transmission) and modified data (during migration) after completion of the UDP transfer, as described in detail above and illustrated by the various figures.

One embodiment of the invention is implemented as a computer program product comprising: a computer readable medium; and program code on the computer readable medium that executes on a processing device of a data processing system to provide the above method functions. Likewise, in one embodiment, a data processing system comprises a VMM utility which executes on the DPS to provide the above method functions. In each of these embodiments, the data processing system (DPS) operates as a first DPS that has a first virtual machine executing thereon with associated memory resources, and the transfer of memory pages/packages and/or migration of the first virtual machine (or guest) is implemented and described from the perspective of the first DPS.

In related embodiments, which occur (or are implemented on and described from the perspective of the second, receiving DPS), the method, computer program product and data processing system further comprises additional functionality as described below. With these embodiments, the data processing system (DPS) operates as a second DPS and is configured to receive memory pages of a first virtual machine and subsequently continue to execute the first virtual machine on the second DPS. The extended method, extended program code, and extended VMM utility (extended implies having additional executable code that executes or is provided at/on the second processor) then executes on the second DPS to provide the functions of: responsive to receiving a first notification via TCP from a first DPS indicating that a first virtual machine is going to be migrated to the second DPS: determining a maximum transfer rate for memory page data between the first DPS and the second DPS; and transmitting via TCP a response message indicating ready for transfer and a maximum allowable transfer rate for transferring memory page data via UDP; monitoring for receipt of pages of data corresponding to the memory page data being transferred from the first DPS; determining when one or more packets being transferred via UDP to the second DPS was not received at the second DPS prior to receipt via TCP of a UDP transfer complete message from the first DPS; generating and issuing a second notification, which is transmitted via TCP to the first DPS and which indicates when one or more packets of the memory pages was not received and identifies which memory pages require a re-transmission; receiving via TCP a final transmission comprising a copy of any memory page not received via UDP transfer and any memory pages which were modified on the first DPS during the transfer/migration of the memory pages/virtual machine.

Additionally, these embodiments provide the functions of: initiating execution of the first virtual machine on the second DPS responsive to a completion of the final TCP transmission; wherein said execution is initiated (a) following any transmission requiring transfer via UDP; and (b) substantially concurrent with a transfer of the final transmission via TCP. Also, the program code for determining when one or more packets being transferred via UDP to the second DPS was not received at the second DPS prior to receipt via TCP of a UDP transfer complete message from the first DPS further comprising code for completing the functions of: receiving within the first notification information indicating a total amount and a range of memory pages to be transferred during migration of the first virtual machine; comparing the packages received during the UDP transfer against the total amount and range of memory pages expected to be transferred during the migration; when the packages for one or more memory pages are not received following the completion of the UDP transfer: identifying the packages that are not received within the second notification issued to the first DPS; and withholding issuance of a standard re-transmit message for UDP transfers when packages are dropped during the UDP transfers.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a first data processing system (DPS) having one or more processors coupled to at least a first memory and providing processor resources and memory resources for a virtual machine, a method comprising:

processor resources on the first DPS identifying all memory pages of the virtual machine for a migration of the virtual machine to a second data processing system with a second memory, wherein the migration involves copying of the memory pages from a corresponding first memory resource to the second memory;
the processor resources sending a virtual machine transfer notification, via transmission control protocol (TCP), to the second DPS alerting the second DPS of the migration of the virtual machine to the second DPS;
receiving via TCP a first acknowledgement from the second DPS, which first acknowledgement includes a maximum allowed transfer rate for copying memory from the first DPS to the second DPS;
forwarding via User Datagram Protocol (UDP) a plurality of packets comprising a transmission of the memory pages of the virtual machine identified for migration;
sending via TCP a completion message to the second DPS to identify completion of the transmission of the memory pages of the virtual machine via UDP; and
responsive to receiving from the second DPS a second notification via TCP indicating that one or more packets or memory pages was not successfully received during the forwarding of the plurality of packets, packaging and forwarding via TCP any missing portions of the memory pages not successfully received by the second DPS.

2. The method of claim 1, further comprising:
setting all memory pages of the memory resources allocated to the virtual machine and which are to be migrated to a read only state prior to initiating the migration;
detecting when a write operation targets the memory pages during the migration of the memory pages and any modifications to the memory resources of the virtual machine at the first DPS, which modifications occurred after initiation and before completion of the migration of the virtual machine;
enabling a write update of the memory pages targeted by the write operation;
tracking each memory page updated by one or more write operations occurring post initiation of the migration; and
following receipt of the second notification from the second DPS via TCP, retransmitting, via TCP, a copy of each memory page which has been modified during the migration of the virtual machine, wherein the updated memory pages are the memory pages that are tracked via the tracking of each memory page updated by one or more write operations occurring post initiation of the migration.

3. The method of claim 2, wherein:
the retransmitting via TCP of the copy of each memory page modified during the migration is performed concurrent with the packaging and forwarding via TCP of any missing portions of the memory pages not successfully received by the second DPS; and
said method further comprises:
coalescing as a combined remaining memory for migration the memory pages that were not successfully transmitted with the memory pages that were modified during the migration;
evaluating a size of the combined remaining memory against a preset maximum size for performing virtual memory migration using TCP; and
in response to the size of the combined remaining memory being larger than the maximum size:
automatically forwarding the combined remaining memory to the second DPS via UDP; and
continue execution of the virtual machine on the first DPS during the migration until all memory pages have been transmitted to the second DPS.

4. The method of claim 3, further comprising:
in response to the size of the combined remaining memory being smaller than the maximum size:
automatically forwarding the combined remaining memory to the second DPS via TCP; and
pausing execution of the virtual machine of the first DPS to avoid further modification of the memory pages during final migration;
wherein a re-transmission of memory pages not received by the second DPS is defaulted to a TCP transmission rather than a UDP transmission when a size of the combined remaining memory for migration falls below a preset threshold size.

5. The method of claim 1, further comprising:
sending via TCP to the second DPS an identification of specific memory pages that will be migrated to second DPS;
in response to: (a) the second notification or a subsequent notification from the second DPS indicating that all of the memory pages identified for migration have been successfully received at the second DPS and (b) a determination that changes have occurred to one or more memory pages following initiation of the migration:
halting execution of the virtual machine on the first DPS when less than a threshold number of memory pages have changed, which can be efficiently transmitted by TCP;
identifying the one or more memory pages that have changed;
performing the transmission of the identified one or more memory pages via TCP; and
signaling for resumption of the execution of the virtual machine on the second DPS following completion of the transmission of the identified one or more memory pages.

6. The method of claim 1, further comprising:
dynamically determining a threshold maximum value for a size of memory data to be migrated via TCP; and
in response to the size of memory data remaining to be migrated exceeding the threshold maximum, performing an initial transfer of memory pages of the virtual machine to the second DPS via UDP utilizing a rate of transfer substantially equal to or less than the maximum allowed transfer rate received from the second DPS in the first acknowledgment; and
in response to the size of memory data remaining to be migrated not exceeding the threshold maximum, performing the transfer of memory pages of the virtual machine to the second DPS via TCP.

7. The method of claim 6, further comprising:
in response to the size of memory data remaining to be migrated being less than the threshold maximum:
pausing an execution of the virtual machine on the first DPS;
preventing further modification of the memory pages on the first DPS; and
sending a notification to the second DPS to continue the execution of the virtual machine on the second DPS following receipt of final data via TCP.

8. A computer program product comprising:
a computer readable storage device; and
program code on the computer readable storage device that executes on a processing device of a data processing system to provide the functions of:
in response to the data processing system (DPS) operating as a first DPS that has a first virtual machine executing thereon with associated memory resources:

identifying all memory pages of the virtual machine for a migration of the virtual machine to a second data processing system with a second memory, wherein the migration involves copying of the memory pages from a first memory resource on the first DPS to the second memory;

sending a virtual machine transfer notification, via transmission control protocol (TCP), to the second DPS alerting the second DPS of the migration of the virtual machine to the second DPS;

receiving via TCP a first acknowledgement from the second DPS, which first acknowledgement includes a maximum allowed transfer rate for copying memory from the first DPS to the second DPS;

forwarding via User Datagram Protocol (UDP) a plurality of packets comprising an initial transmission of the memory pages of the virtual machine identified for migration;

transmitting via TCP a completion message to the second DPS to indicate completion of the initial transmission and any subsequent transmission of the memory pages of the virtual machine; and responsive to receiving from the second DPS a second notification via TCP indicating that one or more packets or memory pages was not successfully received during the forwarding of the plurality of packets, packaging and forwarding via TCP any missing portions of the memory pages not successfully received by the second DPS.

9. The computer program product of claim 8, said program code further comprising executed code for providing the functions of:

setting all memory pages of the memory resources allocated to the virtual machine and which are to be migrated to a read only state prior to initiating the migration;

detecting when a write operation targets the memory pages during the migration of the memory pages and any modifications to the memory resources of the virtual machine at the first DPS, which modifications occurred after initiation and before completion of the migration of the virtual machine;

enable write to the memory pages targeted by the write operation;

tracking each memory page updated by one or more write operations occurring post initiation of the migration;

following receipt of the second notification from the second DPS via TCP, retransmitting, via TCP, a copy of each memory page which has been modified during the migration of the virtual machine, wherein the updated memory pages are the memory pages that are tracked via a tracking process.

10. The computer program product of claim 9, wherein:

the program code for retransmitting via TCP of the copy of each memory page modified during the migration comprises code for performing the retransmitting concurrent with the packaging and forwarding via TCP of any missing portions of the memory pages not successfully received; and said code further comprises executable code for:

coalescing as a combined remaining memory for migration the memory pages that were not successfully transmitted with the memory pages that were modified during the migration;

evaluating a size of the combined remaining memory against a preset maximum size for performing virtual memory migration using TCP;

in response to the size of the combined remaining memory being larger than the maximum size:

automatically forwarding the combined remaining memory to the second DPS via UDP; and continuing execution of the virtual machine on the first DPS during the migration until all memory pages have been transmitted to the second DPS; and in response to the size of the combined remaining memory is smaller than the maximum size:

automatically forwarding the combined remaining memory to the second DPS via TCP; and pausing execution of the virtual machine of the first DPS to avoid further modification of the memory pages during final migration;

wherein a re-transmission of memory pages not received by the second DPS is defaulted to a TCP transmission rather than a UDP transmission when a size of the combined remaining memory for migration falls below a preset threshold size.

11. The computer program product of claim 8, said program code further comprising executable program code for:

sending via TCP to the second DPS an identification of specific memory pages that will be migrated to second DPS;

in response to: (a) the second notification or a subsequent notification from the second DPS indicating that all of the memory pages identified for migration have been successfully received at the second DPS and (b) a determination that changes have occurred to one or more memory pages following initiation of the migration:

halting execution of the virtual machine on the first DPS when less than a threshold number of memory pages have changed, which can be efficiently transmitted by TCP;

identifying the one or more memory pages that have changed;

performing the transmission of the identified one or more memory pages via TCP; and signaling for resumption of the execution of the virtual machine on the second DPS following completion of the transmission of the identified one or more memory pages.

12. The computer program product of claim 8, said program code further comprising executable code for:

dynamically determining a threshold maximum value for a size of memory data to be migrated via TCP; and in response to the size of memory data remaining to be migrated exceeding the threshold maximum, performing an initial transfer of memory pages of the virtual machine to the second DPS via UDP utilizing a rate of transfer substantially equal to or less than the maximum allowed transfer rate received from the second DPS in the first acknowledgment;

in response to the size of memory data remaining to be migrated not exceeding the threshold maximum, performing the transfer of memory pages of the virtual machine to the second DPS via TCP; and in response to the size of memory data remaining to be migrated being less than the threshold maximum:

pausing an execution of the virtual machine on the first DPS;

preventing further modification of the memory pages on the first DPS; and transmitting a notification to the second DPS to continue the execution of the virtual machine on the second DPS following receipt of final data via TCP.

13. The computer program product of claim 8, wherein when the data processing system (DPS) operates as a second DPS that is configured to receive memory pages of a first virtual machine and subsequently continue to execute the first virtual machine on the second DPS, said program code further comprises code which executes on the second DPS to provide the functions of:

responsive to receiving a first notification via TCP from a first DPS indicating that a first virtual machine is going to be migrated to the second DPS:
determining a maximum transfer rate for memory page data between the first DPS and the second DPS; and
transmitting via TCP a response message indicating ready for transfer and a maximum allowable transfer rate for transferring memory page data via UDP;
monitoring for receipt of pages of data corresponding to the memory page data being transferred from the first DPS;
determining when one or more packets being transferred via UDP to the second DPS was not received at the second DPS prior to receipt via TCP of a UDP transfer complete message from the first DPS;
generating and issuing a second notification, which is transmitted via TCP to the first DPS and which indicates when one or more packets of the memory pages was not received and identifies which memory pages require a re-transmission; and
receiving via TCP a final transmission comprising a copy of any memory page not received via UDP transfer and any memory pages which were modified on the first DPS during transfer of the memory pages.

14. The computer program product of claim 13, said program code further comprising code for completing the functions of:
initiating execution of the first virtual machine on the second DPS responsive to a completion of the final TCP transmission;
wherein said execution is initiated (a) following any transmission requiring transfer via UDP.

15. The computer program product of claim 13, said program code for determining when one or more packets being transferred via UDP to the second DPS was not received at the second DPS prior to receipt via TCP of a UDP transfer complete message from the first DPS further comprising code for completing the functions of:
receiving within the first notification information indicating a total amount and a range of memory pages to be transferred during migration of the first virtual machine;
comparing the packages received during the UDP transfer against the total amount and range of memory pages expected to be transferred during the migration; and
in response to the packages for one or more memory pages not being received following the completion of the UDP transfer:
identifying the packages that are not received within the second notification issued to the first DPS; and
withholding issuance of a standard re-transmit message for UDP transfers when packages are dropped during the UDP transfers.

16. A data processing system (DPS) comprising:
at least one memory;
at least one processor each coupled to one or more of the at least one memory;
a communication device associated with the DPS that supports transfer of memory pages from the DPS to a second DPS via transmission control protocol (TCP) and via User Datagram Protocol (UDP);
a virtual machine migration (VMM) utility which executes on the at least one processor and causes the DPS to:

in response to the data processing system (DPS) operating as a first DPS that has a first virtual machine executing thereon with associated memory resources:
identify all memory pages of the virtual machine for a migration of the virtual machine to a second data processing system with a second memory, wherein the migration involves copying of the memory pages from the first memory resource to the second memory;
send a virtual machine transfer notification, via transmission control protocol (TCP), to the second DPS alerting the second DPS of the migration of the virtual machine to the second DPS;
receive via TCP a first acknowledgement from the second DPS, which first acknowledgement includes a maximum allowed transfer rate for copying memory from the first DPS to the second DPS;
forward via User Datagram Protocol (UDP) a plurality of packets comprising a transmission of the memory pages of the virtual machine identified for migration;
transmit via TCP a completion message to the second DPS to indicate completion of the transmission of the memory pages of the virtual machine; and
responsive to receiving from the second DPS a second notification via TCP indicate that one or more packets or memory pages was not successfully received during the forwarding of the plurality of packets, packaging and forwarding via TCP any missing portions of the memory pages not successfully received by the second DPS.

17. The data processing system of claim 16, said utility further comprising executable code that causes the system to:
set all memory pages of the memory resources allocated to the virtual machine and which are to be migrated to a read only state prior to initiating the migration;
detect when a write operation targets the memory pages during the migration of the memory pages and any modifications to the memory resources of the virtual machine at the first DPS, which modifications occurred after initiation and before completion of the migration of the virtual machine;
enable write to the memory pages targeted by the write operation;
track each memory page updated by one or more write operations occurring post initiation of the migration;
following receipt of the second notification from the second DPS via TCP, retransmit, via TCP, a copy of each memory page which has been modified during the migration of the virtual machine, wherein the updated memory pages are the memory pages that are tracked via a tracking process.

18. The data processing system of claim 17, wherein:
the executable code for retransmitting via TCP of the copy of each memory page modified during the migration comprises code that causes the system to perform the retransmitting concurrent with the packaging and forwarding via TCP of any missing portions of the memory pages not successfully received; and
said code further comprises executable code that causes the system to:
coalesce as a combined remaining memory for migration the memory pages that were not successfully transmitted with the memory pages that were modified during the migration;
evaluate a size of the combined remaining memory against a preset maximum size for performing virtual memory migration using TCP;

in response to the size of the combined remaining memory being larger than the maximum size:
automatically forward the combined remaining memory to the second DPS via UDP; and
continue execution of the virtual machine on the first DPS during the migration until all memory pages have been transmitted to the second DPS; and
in response to the size of the combined remaining memory being smaller than the maximum size:
automatically forward the combined remaining memory to the second DPS via TCP; and
pause execution of the virtual machine of the first DPS to avoid further modification of the memory pages during final migration;
wherein a re-transmission of memory pages not received by the second DPS is defaulted to a TCP transmission rather than a UDP transmission when a size of the combined remaining memory for migration falls below a preset threshold size.

19. The data processing system of claim 16, said utility further comprising executable program code that causes the system to:
send via TCP to the second DPS an identification of specific memory pages that will be migrated to second DPS;
in response to: (a) the second notification or a subsequent notification from the second DPS indicating that all of the memory pages identified for migration have been successfully received at the second DPS and (b) a determination that changes have occurred to one or more memory pages following initiation of the migration:
halt execution of the virtual machine on the first DPS when less than a threshold number of memory pages have changed, which can be efficiently transmitted by TCP;
identify the one or more memory pages that have changed;
perform the transmission of the identified one or more memory pages via TCP; and
signal for resumption of the execution of the virtual machine on the second DPS following completion of the transmission of the identified one or more memory pages.

20. The data processing system of claim 16, said utility further comprising executable code that causes the system to:
dynamically determine a threshold maximum value for a size of memory data to be migrated via TCP; and
in response to the size of memory data remaining to be migrated exceeding the threshold maximum, perform an initial transfer of memory pages of the virtual machine to the second DPS via UDP utilizing a rate of transfer substantially equal to or less than the maximum allowed transfer rate received from the second DPS in the first acknowledgment;
in response to the size of memory data remaining to be migrated not exceeding the threshold maximum, perform the transfer of memory pages of the virtual machine to the second DPS via TCP;
in response to the size of memory data remaining to be migrated being less than the threshold maximum:
pause an execution of the virtual machine on the first DPS;
prevent further modification of the memory pages on the first DPS; and
transmit a notification to the second DPS to continue the execution of the virtual machine on the second DPS following receipt of final data via TCP.

21. The data processing system of claim 16, wherein when the data processing system (DPS) operates as a second DPS that is configured to receive memory pages of a first virtual machine and subsequently continue to execute the first virtual machine on the second DPS, said utility further comprises executable code which executes on the second DPS to cause the second DPS to:
responsive to receiving a first notification via TCP from a first DPS indicating that a first virtual machine is going to be migrated to the second DPS:
determine a maximum transfer rate for memory page data between the first DPS and the second DPS; and
transmit via TCP a response message indicating ready for transfer and a maximum allowable transfer rate for transferring memory page data via UDP;
monitor for receipt of pages of data corresponding to the memory page data being transferred from the first DPS;
determine when one or more packets being transferred via UDP to the second DPS was not received at the second DPS prior to receipt via TCP of a UDP transfer complete message from the first DPS;
generate and issue a second notification, which is transmitted via TCP to the first DPS and which indicates when one or more packets of the memory pages was not received and identifies which memory pages require a re-transmission; and
receive via TCP a final transmission comprising a copy of any memory page not received via UDP transfer and any memory pages which were modified on the first DPS during transfer of the memory pages.

22. The data processing system of claim 21, said utility comprising code that causes the system to:
initiate execution of the first virtual machine on the second DPS, wherein said execution is initiated (a) following any transmission requiring transfer via UDP; and (b) substantially concurrent with a transfer of the final transmission via TCP; and
said program code for determining when one or more packets being transferred via UDP to the second DPS was not received at the second DPS prior to receipt via TCP of a UDP transfer complete message from the first DPS further comprising code that causes the data processing system to:
receive within the first notification information indicating a total amount and a range of memory pages to be transferred during migration of the first virtual machine;
compare the packages received during the UDP transfer against the total amount and range of memory pages expected to be transferred during the migration; and
in response to the packages for one or more memory pages not being received following the completion of the UDP transfer:
identify the packages that are not received within the second notification issued to the first DPS; and
withhold issuance of a standard re-transmit message for UDP transfers when packages are dropped during the UDP transfers.

* * * * *